United States Patent [19]

Woodworth et al.

[11] Patent Number: 4,638,729
[45] Date of Patent: Jan. 27, 1987

[54] TORTILLA FOLDER

[75] Inventors: Gary C. Woodworth, Davenport, Iowa; Gary F. Roberts, Colona, Ill.

[73] Assignee: The Kartridg Pak Co., Davenport, Iowa

[21] Appl. No.: 804,814

[22] Filed: Dec. 4, 1985

[51] Int. Cl.[4] .......................... A21C 9/00; A21C 11/00
[52] U.S. Cl. .................................. 99/450.6; 99/450.2; 99/450.7
[58] Field of Search ........................... 99/450.1–450.8, 99/352–356; 426/297, 410, 500–502, 282–284; 53/465, 461

[56] References Cited

U.S. PATENT DOCUMENTS 4,516,487  5/1985  Madison et al. ................... 99/450.6

Primary Examiner—Timothy F. Simone
Attorney, Agent, or Firm—Lockwood, Alex, Fitzgibbon & Cummings

[57] ABSTRACT

In apparatus for folding a dough sheet to enclose a foodstuff filling, such as in a tortilla-forming machine, an improved means for folding opposite sides of the dough sheets having side belts with runs extending along opposite sides of the upper run of a flat conveyor belt and a stationary elongated dough sheet engager disposed over the upper run and between the side belt runs. The side belt runs are substantially co-planar with the conveyor belt adjacent the beginning of its upper run and twist spirally so that intermediate portions thereof become upwardly and inwardly inclined above the conveyor belt upper run. The opposite sides of the dough sheets riding on the conveyor upper run are engaged from their undersides by the side belts and turned upwardly, inwardly and downwardly while being slidably supported by opposite sides of the stationary elongated dough sheet engager. Preferably, the dough sheet engaging surfaces of the stationary dough sheet engager are formed of Teflon or other material having comparable low friction or slippery properties.

6 Claims, 12 Drawing Figures

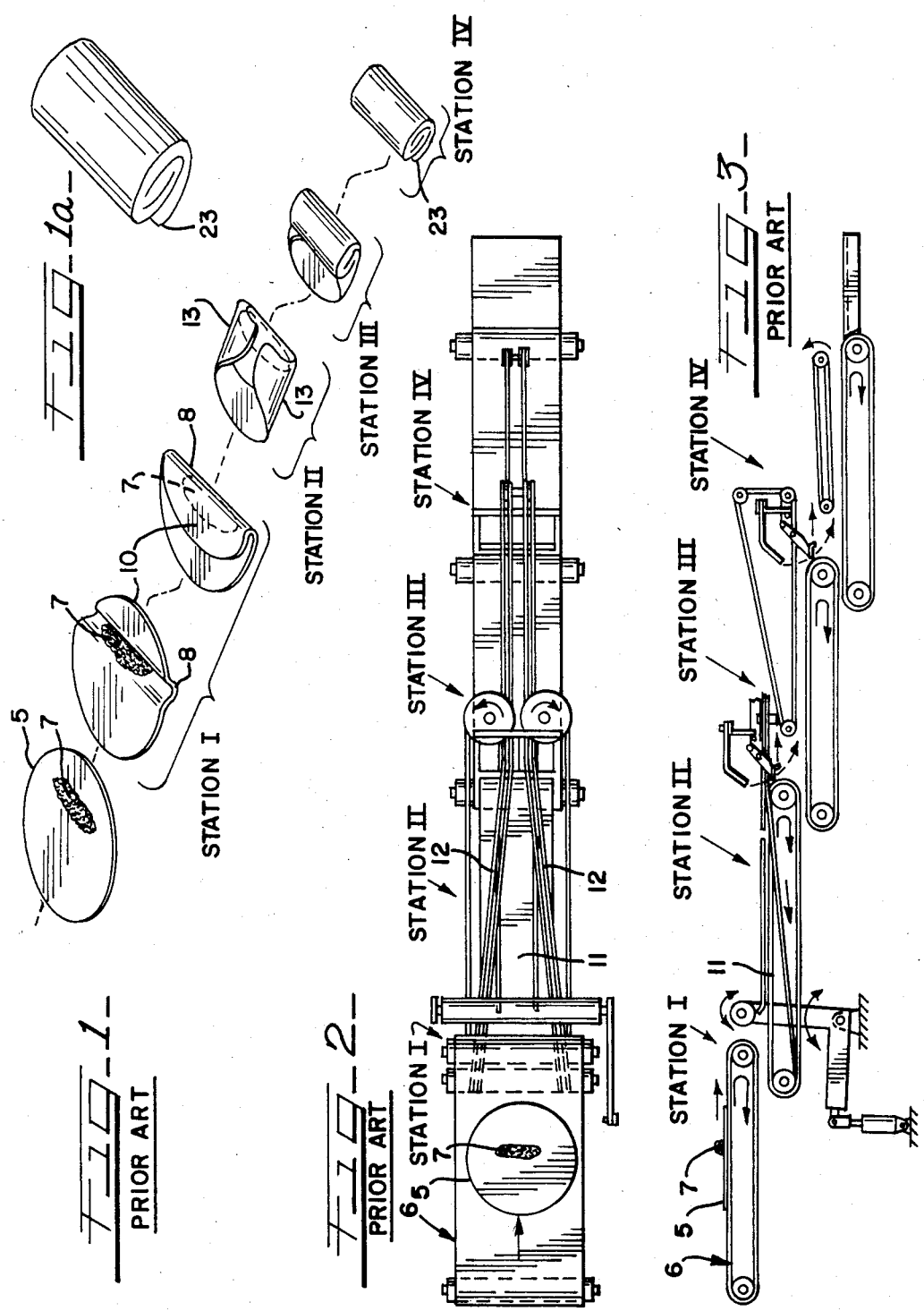

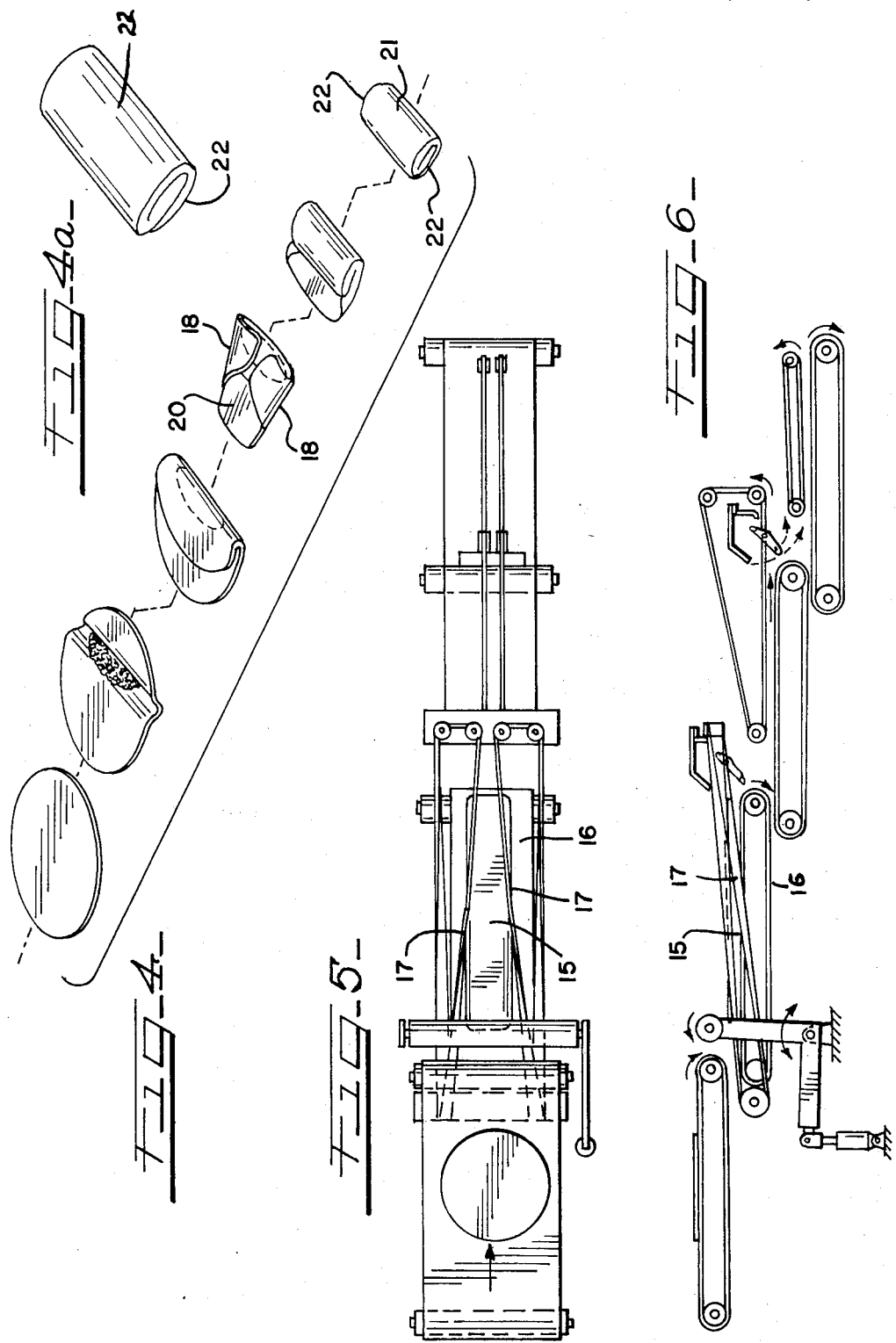

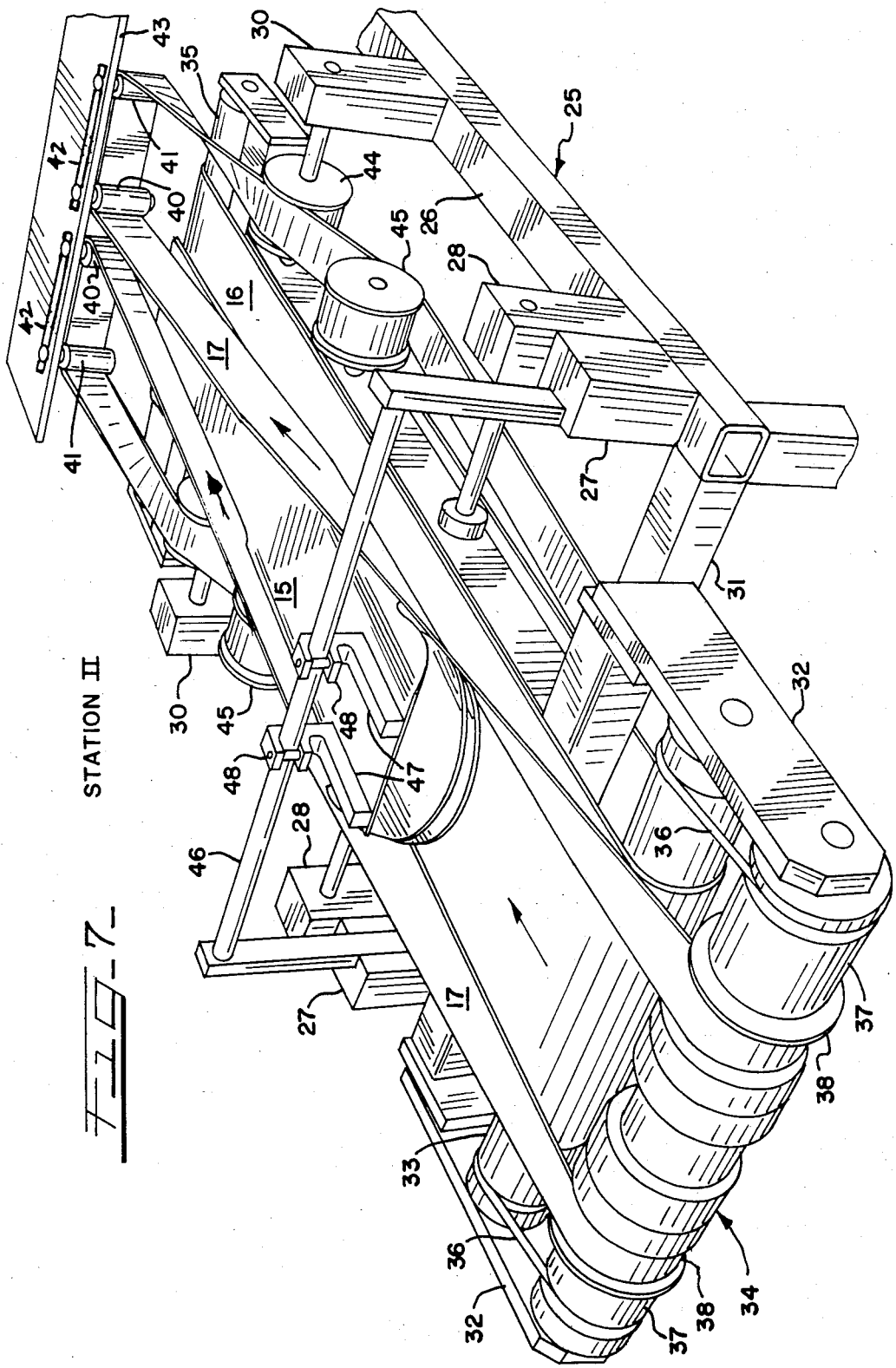

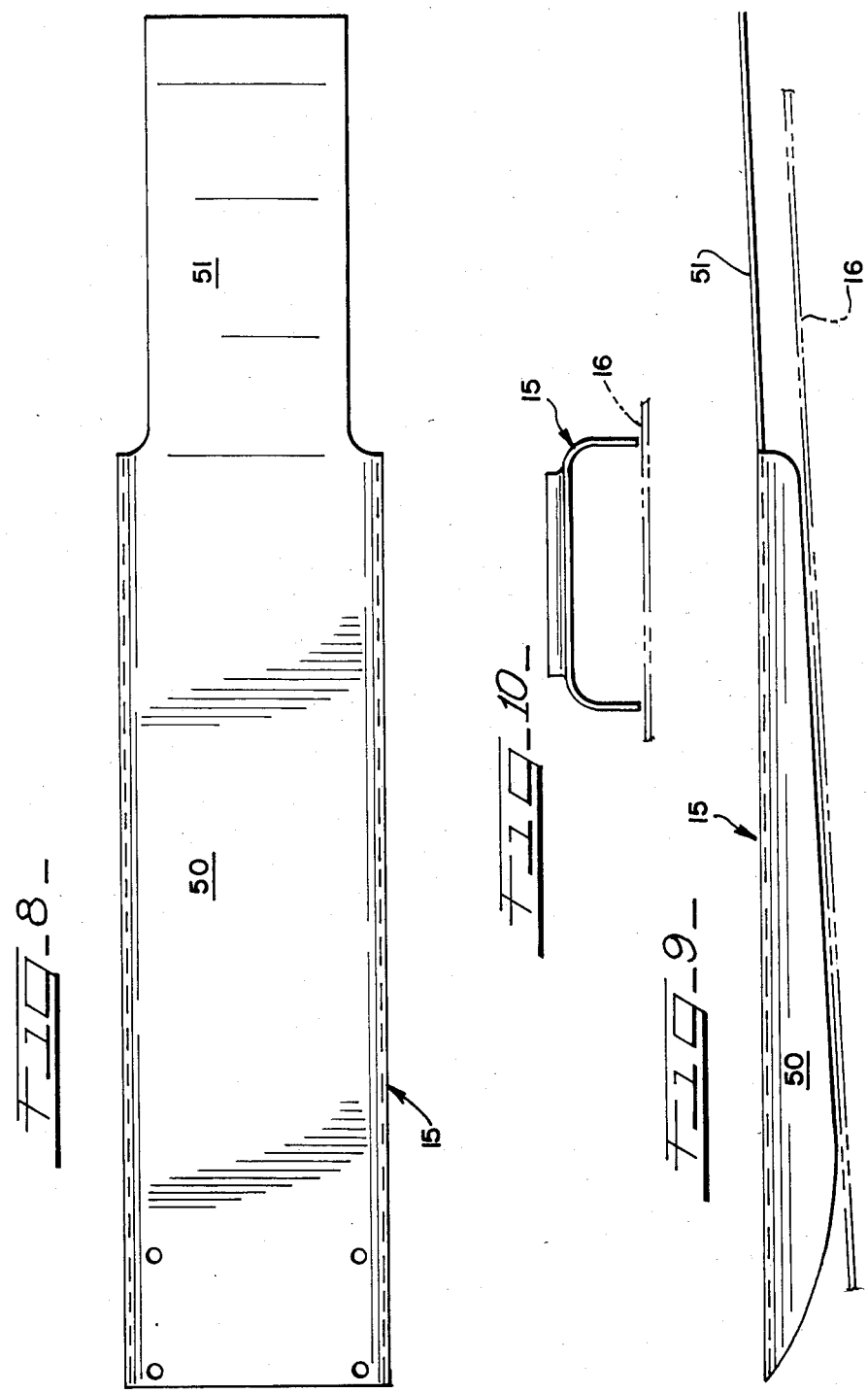

TORTILLA FOLDER

This invention relates generally to improvements in machines or apparatus for folding a dough sheet to enclose a foodstuff filler therein. More particularly, the invention relates to improvements in tortilla-folding machines of the type shown and disclosed in U.S. Pat. No. 4,516,487 dated May 14, 1985.

U.S. Pat. No. 4,516,487 discloses a tortilla folding machine in which a tortilla having a filling deposited thereon is conveyed progressively through what are designated as Stations I, II, III and IV. In Station I, the leading or forward portion of the tortilla dough sheet is folded rearwardly over the filling so as to form a fold at the front which extends generally transversely to the conveying direction. In Station II the opposite sides or flaps of the dough sheet are folded upwardly, inwardly and downwardly so as to form side folds which extend generally parallel to each other and the direction the tortillas are being conveyed. In Stations III and IV, each partially-formed product or article is folded rearwardly so that the dough sheet is completely wrapped around the filler completing the formation of the burrito or similar food product.

The present invention relates particularly to the portion of the dough sheet folding apparatus or machine of U.S. Pat. No. 4,516,487 which infolds the side portions or flaps of the dough sheet or tortilla so as to form the longitudinally extending side folds in Station II. In the operation of the apparatus shown and disclosed in U.S. Pat. No. 4,516,487 the infolding function or operation is performed by a pair of side belts which extend along opposite sides of a horizontal conveyor on which the partially formed burrito is being conveyed in a forward direction. The opposing side belts act to engage the undersides of the opposite sides or flaps of the dough sheet and raise the same upwardly and then fold the same inwardly and downwardly. The resulting side folds are substantially parallel to each other and to the direction of movement of the conveyor.

While the machine shown and disclosed in U.S. Pat. No. 4,516,487 operates in a generally satisfactory manner, there is a tendency for undesirable gussets or tabs of overhanging dough to be formed at opposite ends of the finished burritos or other filler filled and enwrapped products.

The object of the present invention generally stated is the provision of improved infolding means for tortilla-folding machines and similar apparatus of the type shown and disclosed in U.S. Pat. No. 4,516,487, which improved infolding means operates to form side folds which taper inwardly toward each other in a rearward direction relative to the conveying direction so as to form a progressively narrower empty trailing portion behind the forward filled portion of each partially folded burrito. This improvement and the operation thereof prevents the formation of undesirable gussets or tabs of overhanging dough at the opposite ends of the finished or completely formed burritos so that the finished items are characterized by their squared or even ends.

A more specific object of the invention is to provide an improved infolding apparatus and operation, in and for tortilla-folding machines of the general type shown and disclosed in U.S. Pat. No. 4,516,487 wherein a stationary elongated dough sheet engaging member or form is disposed over the flat conveyor belt and the opposite sides of this member cooperate with the spiral or axially twisted portions of the side belts so that the completed side folds taper inwardly toward each other in a rearward direction relative to the centerline and direction of forward movement of the conveyor whereby when the subsequent folding actions are performed there will be no unsightly gussets or tabs of overhanging dough left at the opposite ends of the finished burritos.

Certain other objects and advantages of the invention will be apparent to those skilled in the art in view of the following detailed description of a presently preferred embodiment of the invention taken in connection with accompanying drawings, wherein:

FIGS. 1, 1a, 2 and 3 represent the prior art and correspond to FIGS. 1, 2, and 3 respectively, of U.S. Pat. No. 4,516,487, FIG. 1 being a schematic representation illustrating the progressive folding of a tortilla during formation of a burrito by the apparatus of U.S. Pat. No. 4,516,487, FIG. 1a being an enlarged perspective view of the burrito shown at Station IV in FIG. 1, FIG. 2 being diagrammatic plan view of the apparatus, and FIG. 3 being diagrammatic side elevation thereof;

FIG. 4 is a schematic representation illustrating the progressive folding of a tortilla during formation of a burrito, corresponding generally to FIG. 1 except for the infolding step which is performed in an improved manner in Station II by the improved infolding means of the present invention;

FIG. 4a is an enlarged perspective view of the completely formed burrito shown in FIG. 4;

FIG. 5 is a diagrammatic plan view of a tortilla-folding apparatus corresponding generally to the apparatus shown in U.S. Pat. No. 4,516,487 except for the replacement or modification of the Station II infolding means or apparatus portion of the machine of U.S. Pat. No. 4,516,487 by an improved infolding means or apparatus constituting an embodiment of the present invention;

FIG. 6 is a elevational view of the apparatus shown in FIG. 5;

FIG. 7 is a perspective view of the improved infolding means or apparatus provided by the present invention;

FIG. 8 is a top plan view of the dough sheet engaging form or member which constitutes a key part of the improved infolding apparatus shown in FIG. 7;

FIG. 9 is a side elevational view of the dough sheet engaging form or member shown in FIG. 8; and FIG. 10 is an end elevational view taken on line 10—10 of FIG. 7.

As stated above, the present invention is in the nature of an improvement on known apparatus and machines for folding a dough sheet such as a tortilla shell so as to enclose a foodstuff filling, such as a burrito filling, to form folded burritos or similar products. Also, as stated above, one such known apparatus or tortilla-folding machine is shown and disclosed in U.S. Pat. No 4,516,487. Accordingly, the disclosure and contents of U.S. Pat. No. 4,516,487 are incorporated herein by reference.

In FIG. 1 there is depicted the sequential folding steps which the apparatus and machine of U.S. Pat. No. 4,516,487 performs in producing machine folded burritos or similar products. Referring to FIG. 1 as well as FIGS. 2 and 3, a dough sheet 5, which may be a tortilla shell, is placed on a feed conveyor 6 and conveyed forwardly to Station I. A filling 7 may be deposited on the shell 5 by known mechanism, not shown, either while it is on the conveyor 6 or previously thereto. The mechanism at Station I operates so as to form a transverse fold or crease 8 containing the filling 7. Also in Station I, the leading portion 10 of the sheet or shell 5 is folded upwardly and backwardly over onto the rear portion thereby completing the transverse fold 8.

The partially formed product leaves Station I on the upper run 11 of a flat conveyor belt. As the product advances on the conveyor belt 11 forwardly from left to right, it passes between opposing side belts 12-12 which engage the tortilla underneath opposite sides or flaps thereof which overhang the belt. The side belts 12 fold the sides upwardly and inwardly to further form the product into the condition indicated at Station II in FIG. 1 where it has two side folds 13-13 which extend generally parallel to each and to the direction of conveying movement. On leaving Station II, the product passes through Station III wherein the filled forward portion or leading portion is folded over on itself a indicated in FIG. 1 at Station III. Finally, the product advances to Station IV wherein it is again folded rearwardly on itself to form the completed burrito or other similar food product.

As stated above, the present invention is concerned with improved mechanism and apparatus for Station II. For a description of the improved apparatus for performing the infolding operation represented diagrammatically in Station II, reference may now be had to FIGS. 2-10 of the drawings.

Referring to FIGS. 4, 5 and 6, it will be noted that these figures correspond generally to FIGS. 1, 2 and 3, respectively, except for certain important differences in the apparatus designated as Station II and the functioning thereof. Structurally, the single main difference in the apparatus shown at Station II in FIGS. 5 and 6 and that shown in Station II in FIGS. 2 and 3 is the provision or addition of a stationary elongated dough-engaging form 15 positioned immediately over or above the flat conveyor belt 16 and in between the opposing runs of the side belts 17-17. The shape, properties and functioning of the form 15 and its cooperation with the side belts 17 will be discussed in detail in connection with FIGS. 7-9. However, the end result and the improvements and advantages obtained which are attributable to the changes made in Station II in accordance with the present invention can be pointed out by reference to FIG. 4.

Comparing FIG. 4 representing the present invention with FIG. 1 representing the prior art, it will be noted that after the sides or shell flaps have been infolded, the infolds 18-18 in FIG. 4 are no longer generally parallel. On the contrary, the infolds 18-18 converge in a rearward direction with respect to the center line of the conveyor 16 and its direction of movement from left to right in FIGS. 5 and 6. This configuration or orientation of the infold lines 18 is achieved by the cooperation between the side belts 17-17, the conveyor 16 and inverted U-shaped folder or form 15 and results in a progressively narrower empty trailing portion 20 on the tortilla shell. As a result in this change in configuration of the trailing portion 20, when the tortilla shell passes through Stations III and IV wherein it is rolled or turned rearwardly on itself, the finished tortilla 21 has squared ends 22-22 which are free from the undesirable and insightly gussets 23 (FIGS. 1 and 1a) of overhanging dough such as are typically formed in the prior art apparatus and machine.

Referring to FIG. 7, the frame for Station II is designated generally at 25 and includes side members 26-26 which carry pairs of uprights designated at 27-27, 28-28 and 30-30. The cross member 31 at the rear supports a pair of rearwardly cantilevered side members 32-32 which provide bearing support for a rear conveyor roller 33 and to the rear thereof a multi-section side belt roller 34.

At the forward end of Station II the flat conveyor belt 16 runs over a roller 35 which is a driven roller suitably connected in driving relationship with powered mechanism that does not form a part of the present invention. Thus, the conveyor belt 16 serves to drive the rear conveyor roller 33 which in turn drives the multi-section roller 34 by a pair of drive belts 36-36. The drive belts 36 run in belt grooves provided at opposite ends of the conveyor roller or pulley 33 and in aligned belt grooves formed in the end pulleys 37-37 of the multi-section roller 34. Inwardly of the end pulleys 37, there is a pair of flanged pulleys 38-38 over which run the flat side belts 17-17.

The drive ratio between the conveyor roller 33 and the side belt pulleys 38-38 is such that the side belts 17 are driven at speeds somewhat in excess of the speed of the upper run of the conveyor belt 16. This overdrive relationship between the side belt 17 and conveyor belt 16 contributes to the infolding operation performed in Station II.

At their forward ends, each side belt 17 runs over a set or pair of inner and outer vertical rollers 40 and 41. Each set of vertical rollers 40, 41 is supported for adjustable lateral movement in slots 42-42 in a horizontal frame member 43. The outer and return runs of the side belts 17 pass over and under horizontally mounted guide pulleys 44-44 and 45-45, respectively. This arrangement allows the side belts 17 to be suitably tightened and guided. By having the inner vertical rollers 40-40 spaced closer together than the rear pulleys 38 the inner forwardly moving runs of the side belts 17 are spirally twisted axially in an upward, inward and downward direction while converging toward each other.

The inverted U-shaped or channel-shaped dough folder or form 15 is pivotably supported in cantilever fashion from an overhead support rod 46 by a pair of angle members 47-47. The upper ends of the supports 47 are in the form of rod clamps 48-48. The shape of the folder or form 15 is shown in FIGS. 8-10 wherein it will be seen that form 15 is elongated with a sled-like main portion 50 having an inverted U or inverted channel cross section to which is integrally joined a tail portion 51. The top and side surfaces of the form 15 which are engaged by the dough sheets should be sufficiently slippery as to prevent sticking. It has been found that a form 15 made from Teflon sheet material or from stainless steel coated with Teflon serves very satisfactorily. However, materials other than Teflon can be used including temporary coatings of known non-sticking materials or lubricants that can be used with food products.

Optimum results are obtained in Station II using the apparatus shown in FIGS. 5-10 when the side belts 17 are driven somewhat faster (i.e. are overdriven) with respect to the conveyor belt 16. In a preferred embodiment: the conveyor 16 is approximately 8 inches wide and the upper run is 2½ feet long and moves at a speed of 180 feet per minute, and the side belts 17 are 1½ inches wide and travel at a speed of 230 feet per minute. The co-action between the conveyor belt 16, side belts 17, and stationary form 15 is such as to infold the side flaps in a manner which produces the rearwardly inwardly tapered folds 18-18 and the tapered or narrowed empty trailing portion 20. The width of the tail portion 51 of stationary form 15 limits the degree of taper imparted to the empty trailing portion 20.

We claim:

1. In apparatus for forming a dough sheet so as to enclose therein a foodstuff filling comprising, conveyor means and folding means for folding a dough sheet which as it is being conveyed has a leading portion, a trailing portion and opposite side portions so as to enclose a foodstuff filling deposited thereon and wherein the leading portion of the sheet as it is being conveyed is first folded over said filling with the resulting fold extending generally transversely to the conveying direction and thereafter the opposite side portions of the sheet are infolded upwardly, inwardly and downwardly with the resulting side folds extending generally parallel to the conveying direction;

infolding means comprising, in combination,
a conveyor having a generally horizontal upper run;
side belts having opposing runs extending along opposite sides of said upper run with each of said side belts runs being generally co-planar with the upstream end of said upper run of said conveyor and twisting spirally through at least 90° in an upward and inward direction so as to be inwardly convergent approaching the downstream end of said upper run; and,
stationary elongated dough sheet engaging means disposed lengthwise over said upper run of said conveyor and between said side belt runs, said dough sheet engaging means having elongated opposite side surfaces against which said side portions of said dough sheet are slidably pressed by said side belts during said infolding thereof.

2. In the apparatus called for in claim 1, said conveyor having a generally horizontal run being a flat belt, and each of said side belts being a flat belt.

3. In the apparatus called for in claim 1, the dough-engaging surfaces of said stationary elongated dough sheet engaging means being formed of a slippery material with respect to said dough sheet.

4. In the apparatus called for in claim 1, said stationary elongated dough sheet engaging means being in the shape of an inverted channel for a substantial portion of its length and merging into a flat tail portion at its discharge end.

5. In the apparatus called for in claim 4, the dough engaging surfaces of said stationary elongated dough sheet engaging mean being formed of Teflon.

6. In the apparatus called for in claim 2, said flat conveyor belt running over horizontal parallel pulleys at opposite ends of its upper run, said flat side belts running over a pair of horizontal pulleys disposed adjacent opposite sides of said conveyor upper run adjacent the beginning thereof and running over a pair of vertical pulleys disposed adjacent and above said conveyor upper run at the discharge end thereof, said pair of vertical pulleys being spaced closer together than said horizontal pulleys whereby opposing-intermediate portions of said runs of said side belts are progressively upwardly, inwardly and downwardly inclined.

* * * * *